Oct. 5, 1926.
G. H. GEORGELIS
PRUNING MACHINE
Filed Feb. 10, 1923
1,602,357
5 Sheets-Sheet 4
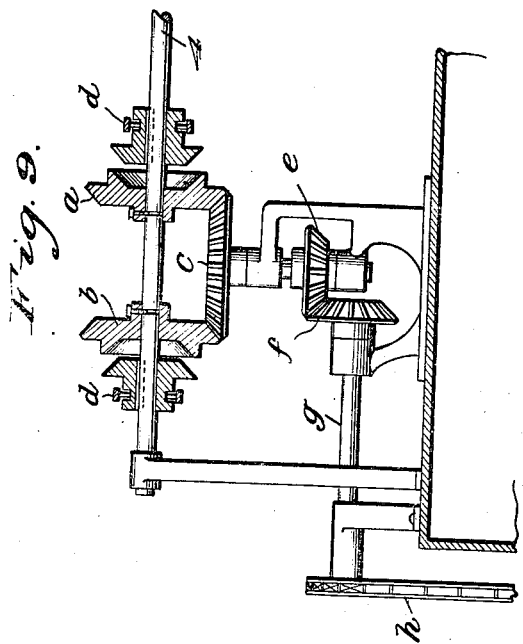
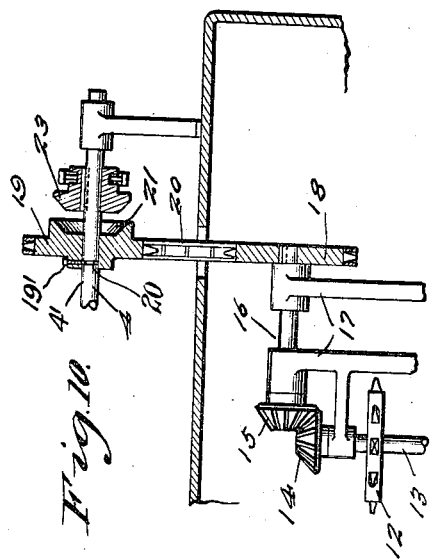
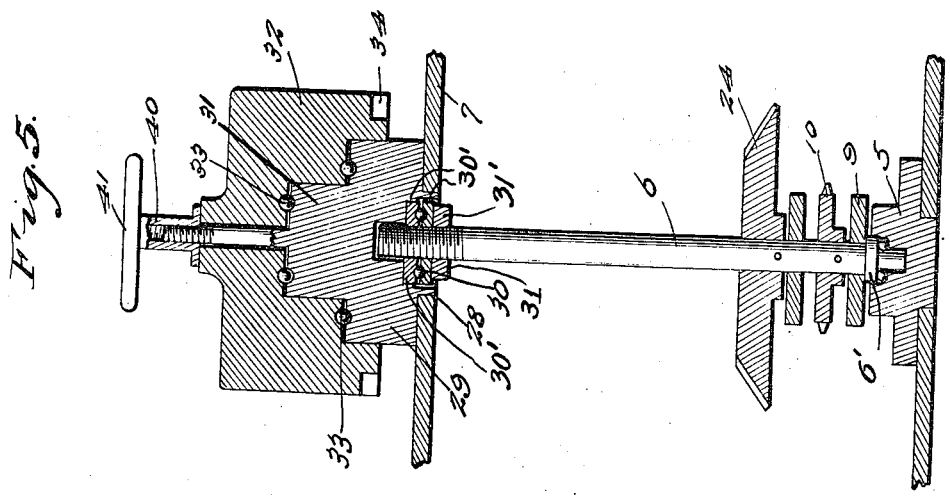
George H. Georgelis INVENTOR
BY *Victor J. Evans*
ATTORNEY

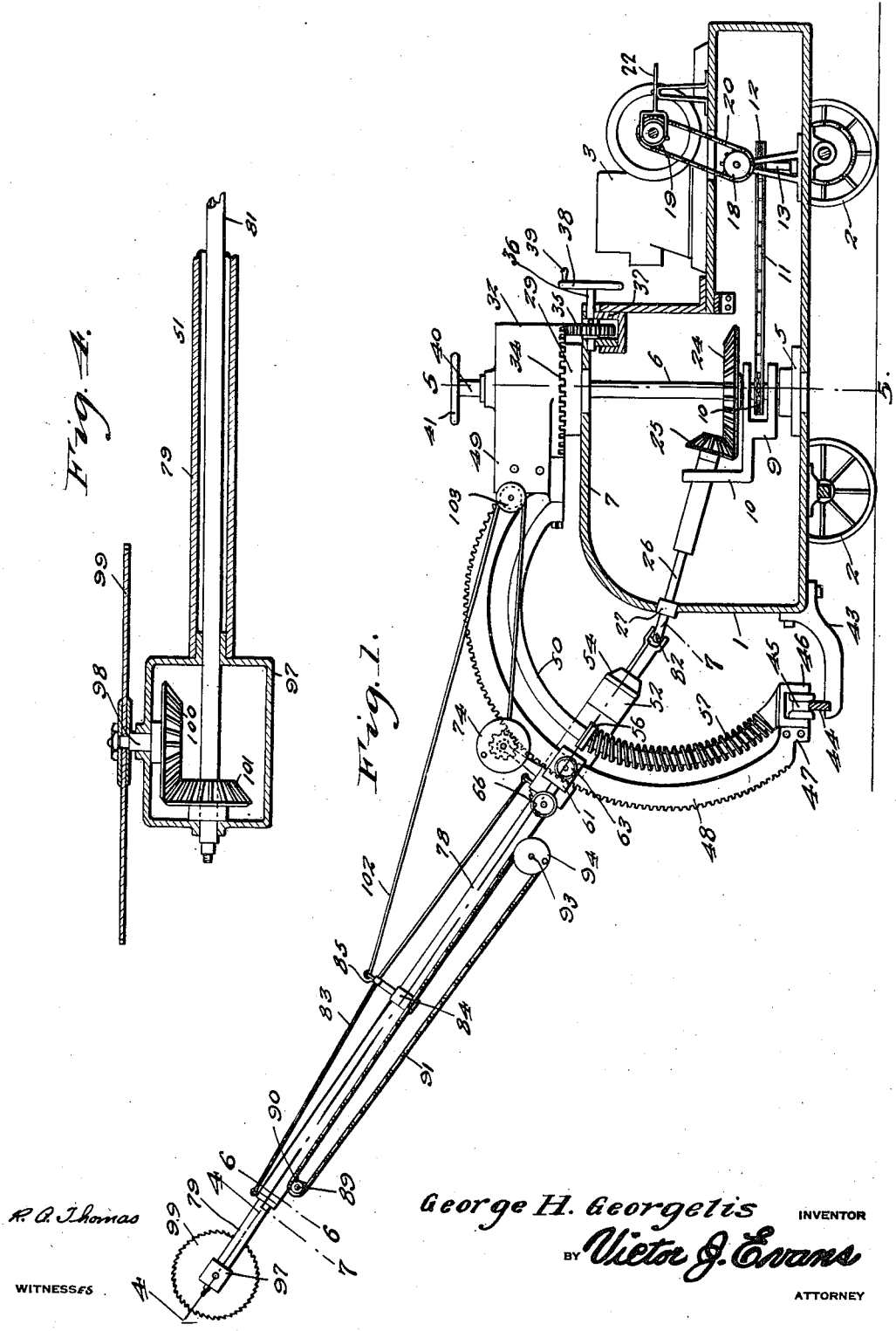

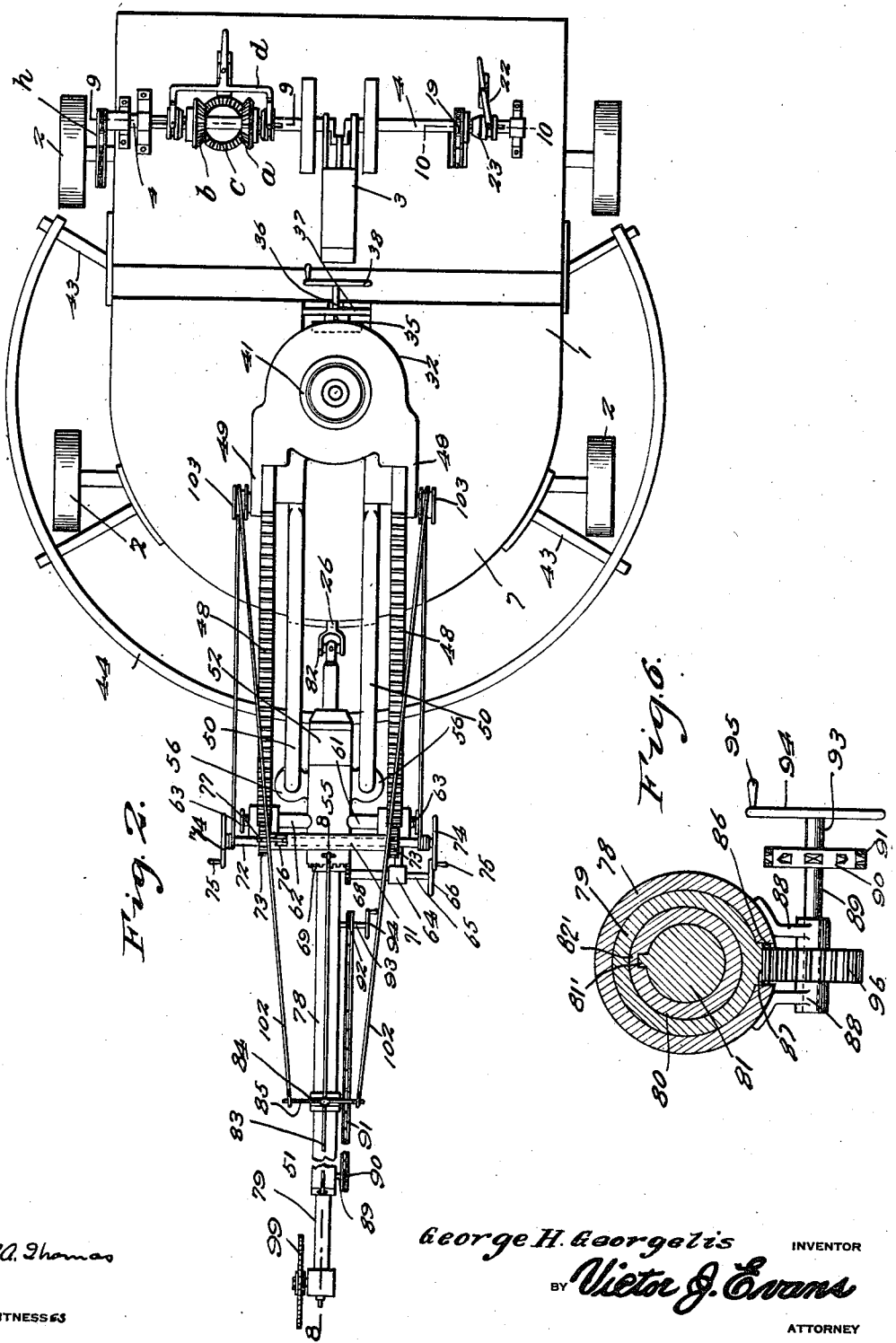

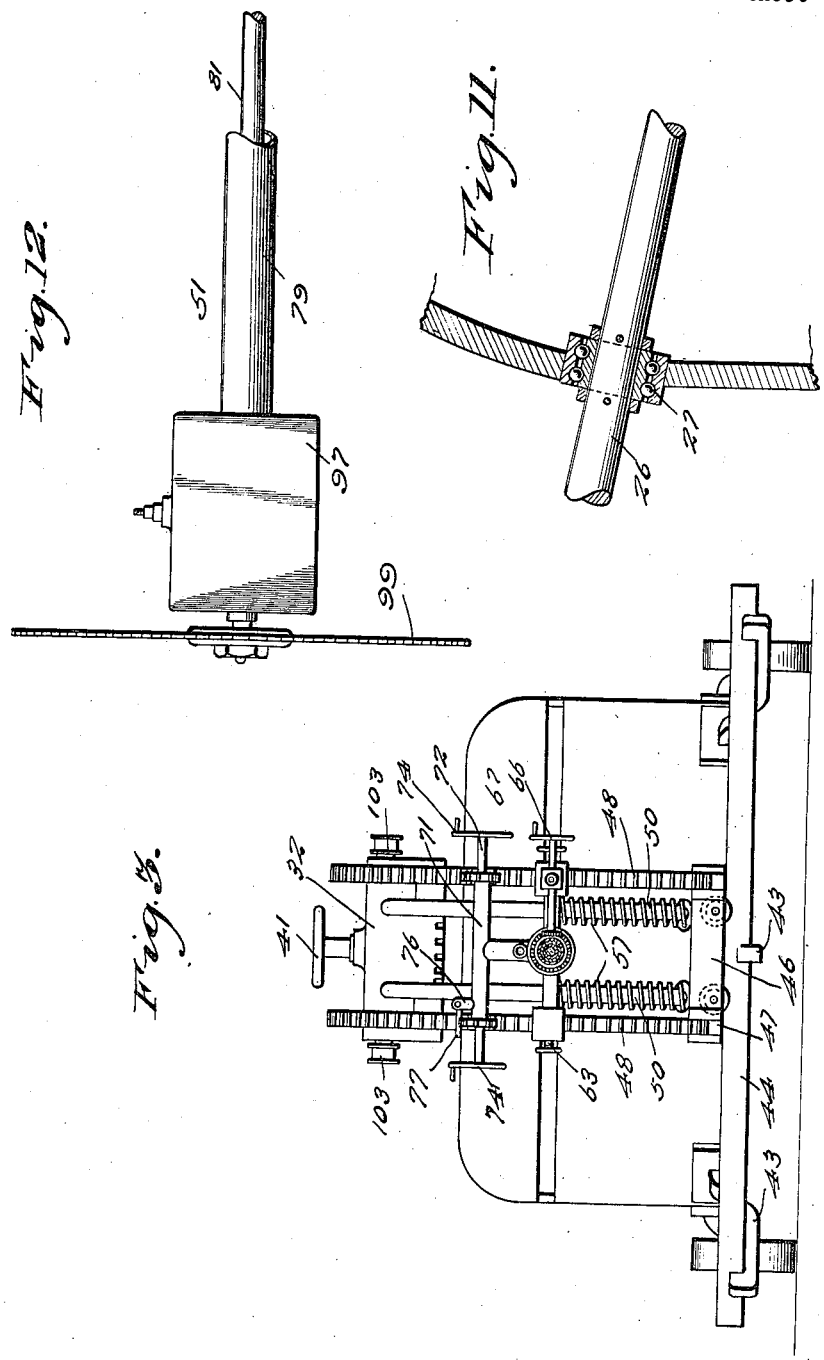

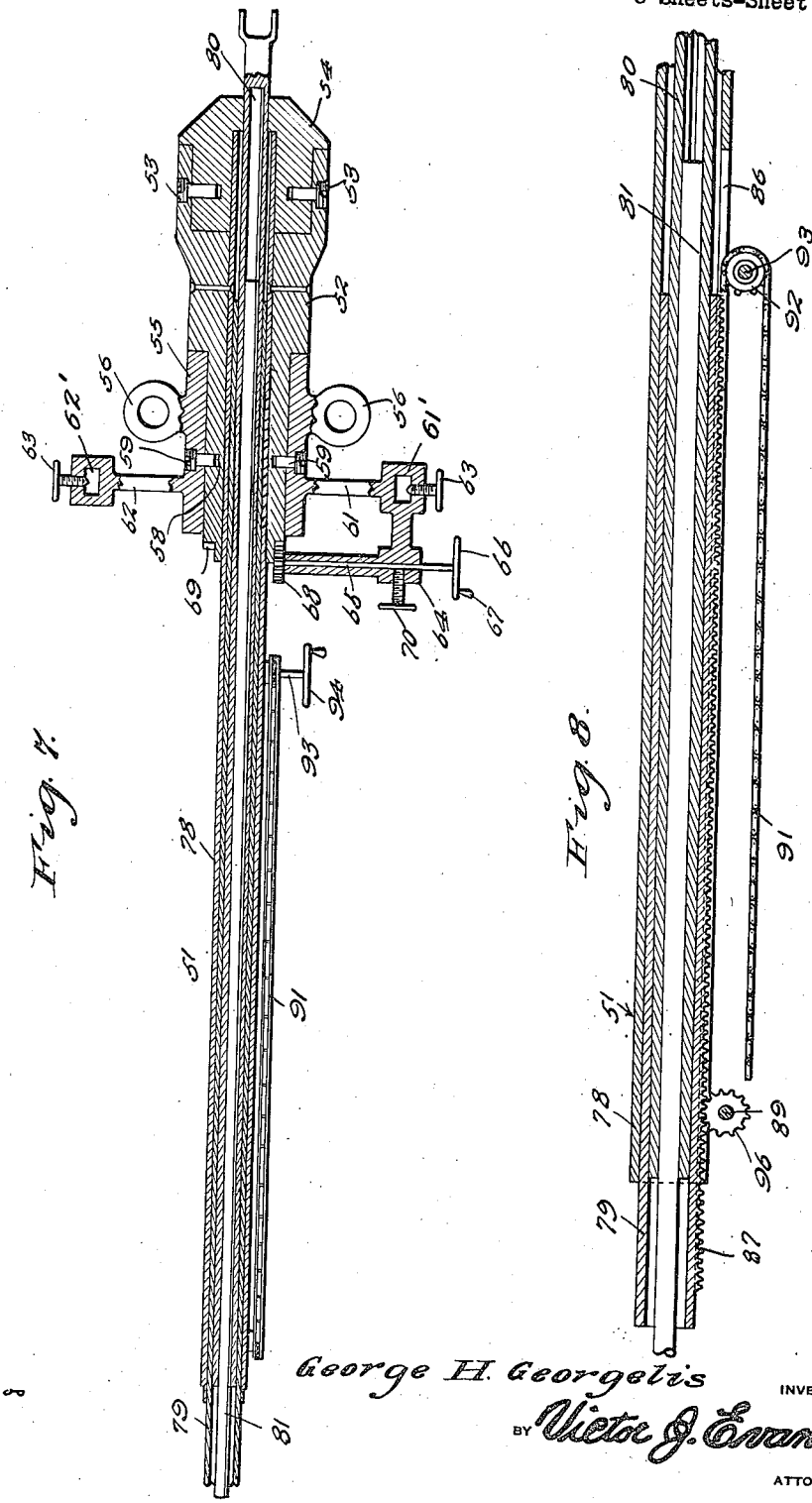

Patented Oct. 5, 1926.

1,602,357

UNITED STATES PATENT OFFICE.

GEORGE H. GEORGELIS, OF ALLSTON, MASSACHUSETTS.

PRUNING MACHINE.

Application filed February 10, 1923. Serial No. 618,415.

My present invention has reference to a portable tree pruning or trimming machine and has for its primary object to produce a machine for this purpose wherein a rotary saw is journaled on a telescopic mast and wherein the same means employed for propelling the machine may be likewise employed for operating the saw, means being provided whereby the mast may be extended so that the saw can properly engage branches at the top as well as adjacent to the bottom of the tree, means being provided whereby the saw may be disposed vertically, horizontally or at desired angles, means being employed for holding the saw in such positions, and means being also employed for effectively bracing the mast and saw under all conditions.

To the attainment of the foregoing, and many other objects which will present themselves as the nature of the invention is better understood, reference is to be had to the drawings which accompany and which form part of this application.

In the drawings:—

Figure 1 is a side elevation of my improved tree trimming machine, parts being broken away and parts being in section.

Figure 2 is a top plan view thereof.

Figure 3 is a front elevation thereof.

Figure 4 is an enlarged sectional view on the line 4—4 of Figure 1.

Figure 5 is an enlarged sectional view on the line 5—5 of Figure 1.

Figure 6 is an enlarged sectional view on the line 6—6 of Figure 1.

Figure 7 is an enlarged sectional view on the line 7—7 of Figure 1.

Figure 8 is a longitudinal sectional view taken on line 8—8 of Figure 2.

Figure 9 is a sectional view taken on line 9—9 of Figure 2.

Figure 10 is a sectional view approximately on the line 10—10 of Figure 2.

Figure 11 is a fragmentary view partly in elevation and partly in section of the mounting for the saw driving shaft embodied in the invention, and Figure 12 is a detail view of the saw.

The body 1 of my improvement is supported on wheels 2 and carries, adjacent to its rear and open end a motor 3. The motor is preferably in the nature of a gasoline engine, the shaft 4 of which has loosely arranged thereon beveled pinions $a$ and $b$ in mesh with a beveled gear $c$. Clutch means, broadly indicated by the character $d$ is mounted in key-ways on the shaft 4 for clutching either of the gears $a$ or $b$ to the shaft, and thereby reverse the turning of the shaft. The gear $c$ has on its shaft a beveled gear $e$ in mesh with a similar gear $f$ whose shaft $g$ is journaled in suitable bearings and carries on its outer end a sprocket wheel around which is trained a sprocket chain $h$ which is also trained around a sprocket wheel on the shaft for the rear wheels 2. The motor 3 is also designed to operate the trimming saw, in a manner which will hereinafter be entered into in detail. The forward end of the body or carriage 1 is provided at its bottom with a bearing member 5 for a vertically directed shaft 6 that projects through an opening in the top 7 of the body or carriage. On the shaft 6, and resting on a collar 6' the bearing 5, there are the spaced arms of a bracket member 9, the said bracket having its end nearest the front of the body or carriage formed with an upstanding portion 10. Between the referred to spaced arms of the bracket 9 there is keyed or otherwise secured on the shaft 6 a sprocket wheel 10 around which is trained a sprocket chain 11 that is likewise trained around a horizontally disposed sprocket wheel 12 mounted on a vertically disposed shaft 13 journaled in suitable bearings in the body 1 below the motor 3. On the shaft 13 there is also secured a beveled gear 14, in mesh with a similar gear 15 whose transversely disposed shaft 16 is journaled in suitable bearings 17 supported in the body. On the shaft 16 there is a sprocket wheel 18 arranged opposite a sprocket wheel 19 on the motor shaft 4, and around these sprocket wheels there is trained a chain 20. The sprocket wheel 19 is loose on the shaft 4 but has secured on one face thereof a clutch element 21 designed to to be engaged by an element 23 on the said shaft. The sprocket wheel 19 is provided with a set screw 19' engaging a circumferential groove 20' in the shaft 4 which serves to hold this sprocket wheel against longitudinal movement. By this arrangement it will be noted that the shaft 6 may be revolved from the motor when desired.

Keyed on the shaft 6, and resting on the top of the bearing bracket 9 there is a beveled toothed wheel 24 in mesh with a beveled pinion 25 secured on one end of a shaft 26 that is received through a bearing 27 in the closed front of the body or carriage 1. The shaft also finds a bearing in the upstanding end 10 of the bracket. The bearing 27 is arranged in a somewhat elongated slot or opening in the front of the body or carriage 1, to permit of a horizontal swinging of the shaft 26 with the bracket 9.

The opening in the top 7 through which the shaft 6 projects is round and is of a greater cross sectional diameter than that of the said shaft. In this opening there is received a boss or round flange 28 on the bottom of a bearing block 29. In a suitable bore or opening through the bottom of this bearing block the end of the shaft 6 is received and there are anti-frictional bearings 30 between the said shaft and the said bore. As shown in Figure 5, these bearings 30 are housed in a ball race 30' which is carried by the upper end of the shaft 6. A nut 31' is carried by this shaft to retain the ball race in position. The block 29 has its upper face centrally provided with a rounded extension or boss 31 that is received in the bore of a block or casting 32, there being anti-friction bearing means 33 between the said casting 32 and the boss or projection 31. The casting 32 has an outer depending flange arranged over the sides of the cross sectionally rounded block 29, and the said flanges have their outer ends formed with teeth 34. The teeth 34 are engaged by a toothed wheel 35 secured on a shaft 36 journaled in bearings in the rear end of the top 7 of the body 1 and in the outer arm of an angle extension 37 on the said rear wall of the top 7. The shaft 36 has on its outer end a wheel 38, and to this wheel there is attached a handle 39. By operating the shaft the wheel 35 will turn the casting 32 on the bearing block 29, and to prevent such turning or rather to hold the block when the casting has been thus turned, the said casting has its outer or upper face provided with a central threaded opening that receives therethrough a nut 40 operated by a head or handle 41. The bolt contacting with the boss 31 on the bearing block 29 will prevent the accidental or free turning of the casting on the block.

Secured to the front of the wheeled body or carriage 1, and to the bottom thereof there is a plurality of outstanding arms 43 that carry at their outer ends an upwardly extending curved rail 44. On the rail 44 there is arranged for travel grooved wheels 45 secured in the bifurcated or slotted lower face of a casting 46. To the outer face of the casting 46 there are secured the inner straight ends 47 of arched rack bars 48 respectively, the opposite ends of the said rack bars being secured to a casting 49 riveted or otherwise connected to the casting 32. The teeth are formed on the outer edges of the rack bars. Also secured to the castings 46 and 49, inward of the rack bars 48 there are arched rods 50 respectively arranged concentric with the segmental rack.

The telescopic saw carrying member is broadly indicated by the numeral 51, and will hereinafter, for the sake of convenience, be referred to as the mast. The rear and supporting member for the telescopic mast is indicated by the numeral 52, the same having a tubular bore, a widened inner end and a reduced outer end. The bore, at the inner end of the mast supporting member 52 is also widened and has received therein and secured thereto by screws 53 an end section 54. On the reduced outer end of the mast support 52, and in contact with the shoulder provided between said end and the section proper there is a sleeve 55 provided with opposed outstanding ears 56 having openings therethrough to receive the arched rods 50, and on the said rods, in contacting engagement with the under faces of the ears 56 and with the casting 46 are helical springs 57.

The portion of the mast support 52, on which the sleeve 55 is arranged, is provided with an annular groove 58 and passing through the sleeve and received in the said groove there are pins which have outer threaded heads 59 which are kerfed and screwed in the said sleeve 55. The sleeve has oppositely extending arms 61 and 62. Each arm has an open rectangular enlargement 61' and 62', respectively, that receive therethrough the arched racks 48. Binding elements 63 hold the racks in the openings provided in said enlargements and whereby the mast is held from arcuate movement on said racks and on the arched rods 50.

The enlarged outer end of the arm 61 is formed with an extension in the nature of a boss 64 having a transverse opening therethrough that provides a bearing for a shaft 65. The outer end of this shaft has secured thereon a wheel 66 provided with an operating handle 67, and the inner end of the shaft has keyed or otherwise secured thereon a pinion 68. This pinion meshes with a ring gear 69 formed on or adjacent to the outer end of the mast supporting section 52. The boss 64 has a threaded opening therethrough for the reception of a headed screw 70, the said screw designed to contact with the shaft 65 to hold the same from turning.

The sleeve 55 is formed with a web, and this web merges into a barrel 71 arranged transversely between the arched racks 48. The barrel 71 provides a bearing for a shaft 72, the said shaft having keyed thereon pinions 73, each of which being in mesh with the respective arched racks 48. The outer ends of the shaft 72 have secured thereon the wheels 74 provided with handles 75. It will be apparent that by turning the shaft 72 the pinion 73 meshing with the racks 48 will swing the mast supporting member to vertical inclinations. It will be further apparent that by turning the shaft 65 the revoluble mast support 52 will be turned to various horizontal positions, and also that by operating the shaft 36 the casting 32 will be turned on the bearing block 29, the frame, comprising the casting 32, the arched bars 50, the rack bars 48 and the casting 32 will be swung at the desired lateral angles with respect to the body 1. It will also be apparent that by tightening the screws 63 the mast section 50 will be locked to the carriage, and by tightening the screw 70 the shaft 65 will be locked from turning, and likewise by tightening the nut 41 the carriage will be prevented from turning.

Between the gears 73 and the barrel 71 there are locking means, the barrel 71 being provided with end lugs 76 carrying pawls 77 to engage between the teeth of the gear 74, and thereby lock the said shaft 72 from free or accidental movement.

The mast includes what I will term an outer tubular member 78 secured in the bore of the support 52, an inner tubular member 79 keyed to but slidable through the section 78, tubular shaft section 80 and a solid shaft section 81.

The hollow shaft section 80 projects through the end section 54 of the supporting section 52, and has a universal connection indicated by the numeral 82 with the end of the shaft 26 that projects through the bearing 27.

Between the inner end of the shaft support 52 and the outer end of the tubular member 78 there is connected the ends of a wire or other truss brace 83, there being secured around the said member 78 a ring 84 having a yoke extension 85 over which the cable 83 is trained. The outer tube 78 is provided with an elongated slot or opening 86, the inner tube 79 being provided with a rack 87 that is received through the opening. Secured on the said tube 78, adjacent to the outer end thereof there are spaced brackets 88 arranged adjacent the longitudinal walls of the opening 86. These brackets are provided with bearing openings for a shaft 89, the said shaft having on one of its ends a sprocket wheel 90 around which is trained a sprocket chain 91 that is likewise trained around a sprocket wheel 92 secured on a stub shaft 93 journaled in suitable bearings on one side of the tube 78. The shaft has on its outer end a wheel 94 provided with an operating handle 95. On the shaft 89 between the brackets 88 there is keyed a pinion 96 in mesh with the rack bar or surface 87, and it will be apparent that by revolving the shaft 93 the pinion will project the inner tube 79 a suitable distance through the outer tube 78, and such movement of the tube 89 will impart a like movement to the solid section 81 of the shaft. To accomplish this the solid shaft section 81 is provided with a key 81' that projects through an elongated slot 82' in the hollow shaft section 80, the said key also projecting through a slot of a less length in the inner sleeve section 79. It will thus be noted that the telescopic shaft may be expanded or contracted in an easy, quick and expeditious manner.

On the outer end of the inner tube 79 there is secured a gear box 97 through which the projecting end of the solid shaft section 81 passes. Journaled in a suitable bearing through one side of the gear box there is a short shaft 98 that carries on its outer end a circular saw 99. The inner end of the shaft has secured thereon a beveled gear 100 which is in mesh with a similar gear 101 carried by the shaft section.

Secured to the yoke 85 of the ring member 84 there are cables 102 respectively. These cables are trained around sheave wheels 103 which have their stub shafts journaled in bearings at the sides of the casting 49, the said cable 102 being directed toward and secured around the ends of the shaft 72 between the handle wheels and the disks thereon. By such arrangement it will be noted that the cables 102 will be drawn taut when the mast is raised to vertical inclinations and will be slackened when the mast is lowered. The cables, however, at all times brace and strengthen the mast, and it is thought that the foregoing description, when taken in connection with the drawings will fully set forth the construction, operation and advantages of the improvement to those skilled in the art to which this invention relates. It will be apparent that branches of trees either near the ground or at great elevations may be pruned by the saw, that the saw may be turned to any desired angle, that the construction is simple in view of the nature of the invention, and while I have herein set forth a satisfactory embodiment of the improvement as it now appears to me, it is to be understood that I hold myself entitled to make all such changes therefrom as fall within the scope of what I claim without departing from the spirit of the invention.

Having described the invention, I claim:—

1. In a tree pruning machine, a carriage, a track on the forward end of the carriage, a wheeled arched frame arranged on the track, a pivotal bearing for the opposite end of the frame on the carriage, means on the carriage for turning the bearing to swing the frame, means locking the frame from swinging, said frame having its outer members toothed and its inner members in the nature of cross sectionally rounded rods, a mast made up of telescopic sections and including a shaft and a rotary saw designed to be driven by the shaft, means loose on the inner member of the mast receiving the inner bars of the frames therethrough, a sleeve surrounding the said inner section of the mast, coengaging means between the sleeve and said mast section permitting the said section to revolve in the sleeve, outstanding arms on the sleeve having sockets receiving the arched racks of the frame therethrough, binding means between said sockets and racks, revoluble means carried by one of the sockets engaging the inner mast section for imparting a rotary motion thereto, means for locking said last mentioned means, a barrel on the sleeve, a shaft journaled therethrough, pinions thereon in mesh with the rack members of the frame, means between the barrel and pinions for holding the shaft from turning, and means between the motor and the mast for revolving the latter, the shaft thereof and the saw operated by said shaft.

2. In a tree pruning machine, a carriage, a track on the forward end of the carriage, a wheeled arched frame arranged on the track, a pivotal bearing for the opposite end of the frame on the carriage, means on the carriage for turning the bearing to swing the frame, means locking the frame from swinging, said frame having its outer members toothed and its inner members in the nature of cross sectionally rounded rods, a mast made up of telescopic sections and including a shaft and a rotary saw designed to be driven by the shaft, means loose on the inner member of the mast receiving the inner bars of the frames therethrough, spring buffer means on said members in contact with a sleeve surrounding the said inner section of the mast, coengaging means between the sleeve and said mast section permitting the said section to revolve in the sleeve, outstanding arms on the sleeve having sockets receiving the arched racks of the frame therethrough, binding means between said sockets and racks, revoluble means carried by one of the sockets engaging the inner mast section for imparting a rotary motion thereto, means for locking said last-mentioned means, a barrel on the sleeve, a shaft journaled therethrough, pinions thereon in mesh with the rack members of the frame, means between the barrel and pinions for holding the shaft from turning, rigid brace means between the outer and inner sections of the mast, flexible brace means between the mast and frame, said last mentioned means having their ends secured to the last mentioned shaft, and means operated by the motor for imparting a rotary motion to the mast and saw.

3. In a tree pruning machine, a carriage, a track on the forward end of the carriage, a wheeled arched frame arranged on the track, a pivotal bearing for the opposite end of the frame on the carriage, means on the carriage for turning the bearing to swing the frame, means locking the frame from swinging, said frame having its outer members toothed and its inner members in the nature of cross sectionally rounded rods, a mast made up of telescopic sections and including a shaft and a rotary saw designed to be driven by the shaft, means loose on the inner member of the mast receiving the inner bars of the frames therethrough, a sleeve, surrounding the said inner section of the mast, coengaging means between the sleeve and said mast section permitting the said section to revolve in the sleeve, outstanding arms on the sleeve having sockets receiving the arched racks of the frame therethrough, binding means between said sockets and racks, revoluble means carried by one of the sockets engaging the inner mast section for imparting a rotary motion thereto, means for locking said last mentioned means, a barrel on the sleeve, a shaft journaled therethrough, pinions thereon in mesh with the rack members of the frame, means between the barrel and pinions for holding the shaft from turning, means for adjusting the telescopic mast sections and the shaft carried thereby, and means operated by the motor for revolving the mast and saw.

In testimony whereof I affix my signature.

GEORGE H. GEORGELIS.